United States Patent
Daigle

(10) Patent No.: US 7,831,268 B2
(45) Date of Patent: *Nov. 9, 2010

(54) ROUTING COMMUNICATION BASED ON URGENCY PRIORITY LEVEL

(75) Inventor: Brian Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/590,629

(22) Filed: Nov. 12, 2009

(65) Prior Publication Data

US 2010/0062778 A1 Mar. 11, 2010

Related U.S. Application Data

(63) Continuation of application No. 11/402,494, filed on Apr. 11, 2006, now Pat. No. 7,676,237.

(51) Int. Cl.
*H04B 7/00* (2006.01)
(52) U.S. Cl. .................. 455/512; 455/435.3; 455/445; 455/413
(58) Field of Classification Search ............ 455/445, 455/435.3, 512, 414.1, 415, 420, 435.2, 435.1, 455/513, 514, 521, 413; 370/229, 400, 338; 709/238, 102, 207, 206; 707/102
See application file for complete search history.

(56) References Cited

U.S. PATENT DOCUMENTS

| 6,636,587 | B1 * | 10/2003 | Nagai et al. | 379/88.14 |
|---|---|---|---|---|
| 6,701,346 | B1 * | 3/2004 | Klein | 709/206 |
| 2004/0254998 | A1 * | 12/2004 | Horvitz | 709/206 |
| 2006/0041583 | A1 * | 2/2006 | Horvitz | 707/102 |
| 2006/0233144 | A1 * | 10/2006 | Matsumoto | 370/338 |
| 2006/0242250 | A1 * | 10/2006 | Koch et al. | 709/206 |
| 2008/0228883 | A1 * | 9/2008 | Koch et al. | 709/206 |
| 2008/0301252 | A1 * | 12/2008 | Lipton et al. | 709/207 |

* cited by examiner

*Primary Examiner*—Tan Trinh

(57) ABSTRACT

Methods, systems, devices, and computer program products route communication based on an urgency priority associated with a sender of the communication. The method involves receiving incoming communication, identifying the sender, determining an urgency priority designation associated with communication, and routing the incoming communication according to routing instructions associated with the urgency priority designation. Prior to receiving the incoming communication, the method may further involve receiving a selection to configure routing of communication based on one or more urgency priority designations, rendering urgency priority options and routing options that provide routing instructions, receiving routing instructions associated with each urgency priority designation, and receiving and recording the urgency priority designation associated with the sender. Still further, the method may involve offering the sender routing options based on the urgency priority designation and receiving a selection of one of the routing options from the sender.

20 Claims, 5 Drawing Sheets

SENDER: JOHN DOE
☑ OPTIONS
☐ DEFAULT

304 — CONTACT DATA ENTRY FOR INDIVIDUAL SENDER

| NAME | NUMBER | URGENCY PRIORITY LEVEL | RELATIONSHIP |
|------|--------|------------------------|--------------|
| BOB | 555-333-7777 | 3 | BOSS |
| JANE | 323-323-4554 | 2 | SPOUSE |
| JOHN | 555-224-9856 | 1 | BOSS |
| MARK | 555-223-5678 | 2 | FRIEND |
| CINDY | 323-456-9878 | 3 | ACQUAINTANCE |

CONTACT DATA ENTRIES FOR SPECIFIC SENDERS

305 —

| RELATIONSHIP | PRIORITY/URGENCY LEVEL |
|--------------|------------------------|
| WIFE | 1 |
| BOSS | 1 |
| FRIENDS | 2 |
| ACQUAINTANCE | 3 |
| OTHERS | DEFAULT |
| DEFAULT | 3 2 1 |

CONTACT DATA ENTRIES BASED ON RELATIONSHIP TO SENDER

US 7,831,268 B2

ROUTING COMMUNICATION BASED ON URGENCY PRIORITY LEVEL

CLAIM OF PRIORITY

This application is a continuation of application Ser. No. 11/402,494, entitled "Routing Communication Based on Urgency Priority Level," filed Apr. 11, 2006, now U.S. Pat. No. 7,676,237, issued Mar. 9, 2010.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention generally relates to routing communication based on urgency priority.

BACKGROUND

With the proliferation of electronic and/or portable communication devices today, many people are more accessible than they necessarily choose to be. For instance, everyone who calls an individual's active cell phone will cause the cell phone to ring. The individual receiving the call will need to look at every single call to evaluate whether the call has an urgency or priority that merits an answer. The regular evaluation of each call can consume an individual's valuable time. Alternatively, if the individual decides to turn off the communication device, an important communication may be missed.

The above-mentioned problems are further complicated with conventional methods and devices when an individual is expecting an important call from someone, for instance a spouse. If the spouse decides to call concerning a trivial matter that can wait, it is very likely the spouse will cause an unnecessary interruption for the individual.

Accordingly there is an unaddressed need in the industry to address the aforementioned and other deficiencies and inadequacies.

BRIEF DESCRIPTION OF THE DRAWINGS

FIG. 3 illustrates interface displays utilized in an illustrative embodiment of the invention;

DETAILED DESCRIPTION

As described briefly above, embodiments of the present invention provides for routing communication based on urgency priority. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
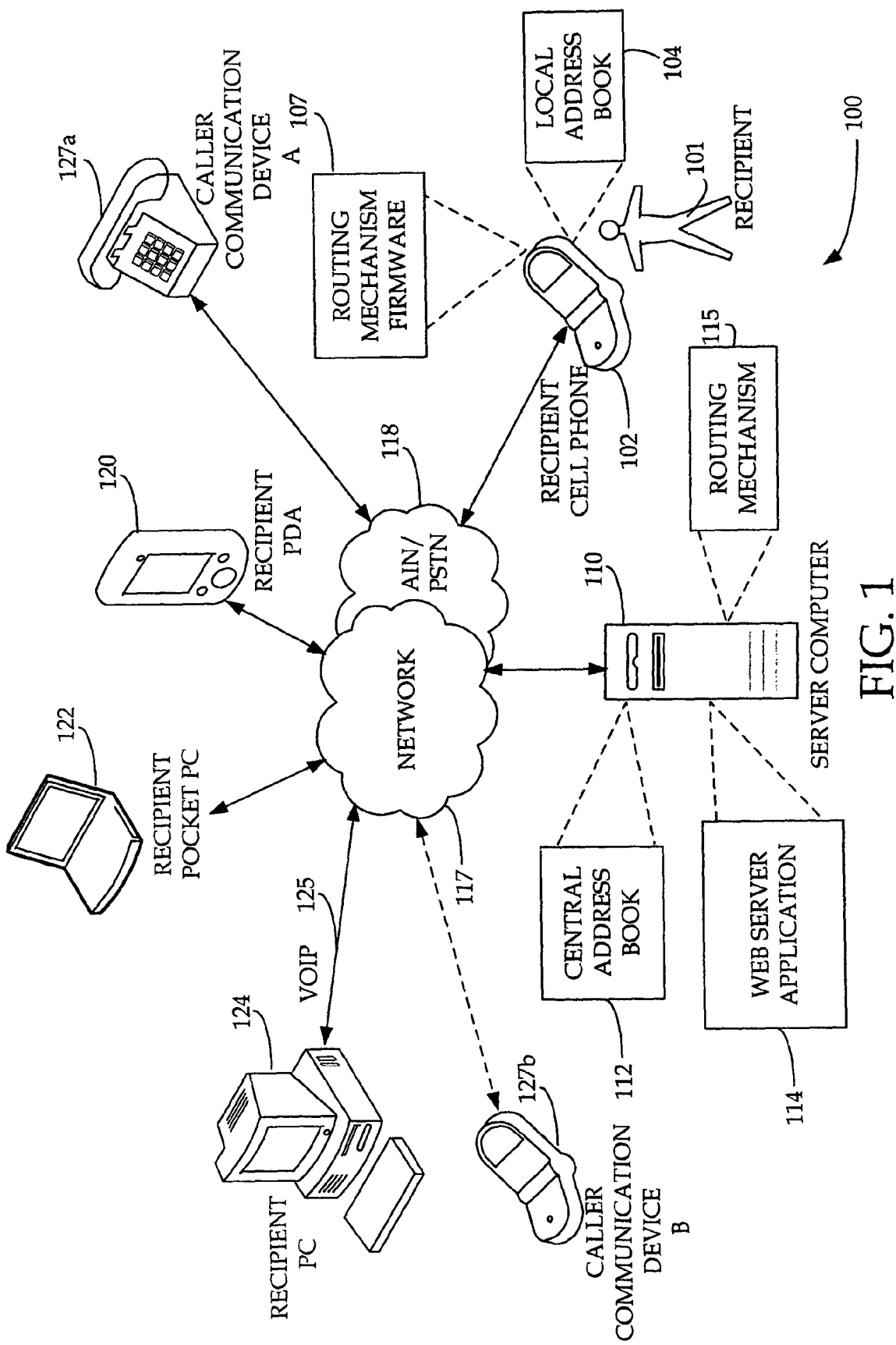
FIG. 1 is a schematic diagram illustrating aspects of a networked operating environment utilized in an illustrative embodiment of the invention.
Figure 2:
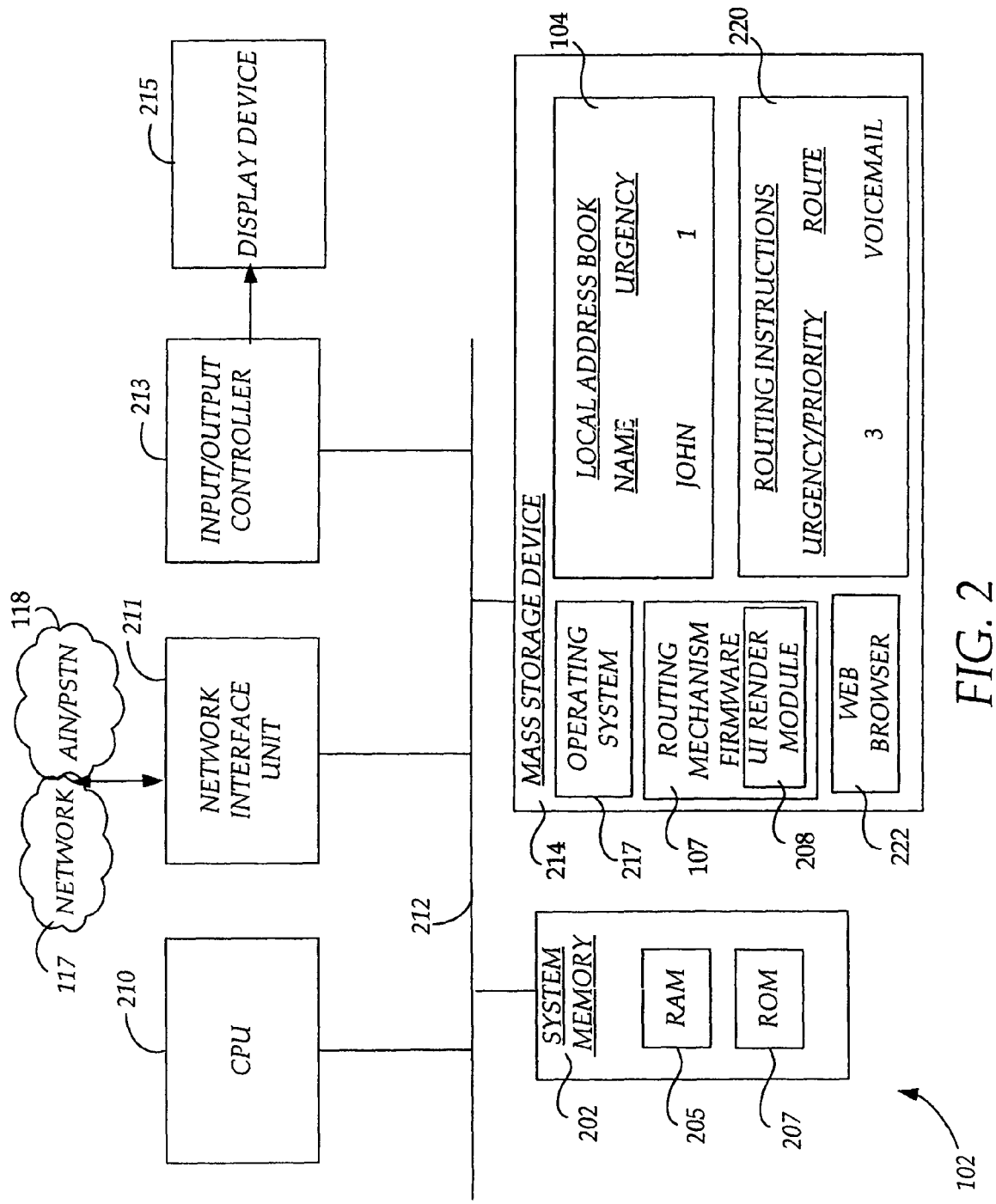
FIG. 2 illustrates computing system architecture for a communication device utilized in an illustrative embodiment of the invention.

Referring now to the drawings, in which like numerals represent like elements through the several figures, aspects of the present invention and the illustrative operating environment will be described. FIGS. 1-2 and the following discussion are intended to provide a brief, general description of a suitable computing environment in which the embodiments of the invention may be implemented. While the invention will be described in the general context of program modules that execute on a computing apparatus device or a server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings. Referring now to FIG. 1, a schematic diagram illustrating aspects of a networked operating environment 100 utilized in an illustrative embodiment of the invention will be described. As shown in FIG. 1, the networked environment 100 includes both wired and wireless devices, such as a cellular phone 102, a personal digital assistant (PDA) 120, a pocket personal computer (PC) 122, and a PC 124, utilized by a recipient of incoming communication such as a phone call, email, or a text message. At least one of the wired or wireless devices utilized by this recipient, such as the cellular phone 102, includes routing mechanism firmware 107 and a database storing information on contacts or senders of communication, for instance a local address book 104.

The networked environment 100 also includes a server computer 110 providing centralized routing services via a routing mechanism 115, a web server application 114, and a central address book 112 over a network 117, such as the Internet, and/or an advanced intelligent network/public switch telephone network 118 (AIN/PSTN). One or more senders of communication, such as a caller utilizing a communication device A 127a or a message sender utilizing a communication device B 127b, initiate communication with the recipient over the network 117 and/or AIN/PSTN 118. Voice call communication may be routed to wired or wireless devices via a voice over Internet protocol (VOIP) connection, such as VOIP connection 125.

According to an embodiment of the present invention, when the recipient 101 has contact information for a sender in an address book 104 or 112 he or she can categorize and prioritize communication sent from people in that address book. For instance, the recipient may want communication from his boss to have a different urgency priority than communication sent from his spouse. For example, the recipient may want communication from his boss to always be forwarded to a voicemail or routed to a certain different location based upon an urgency priority. In contrast, if the recipient's spouse is sending the communication, the recipient may want his cell phone 102 to automatically change to a loud ring or all of his devices 102, 120, 122, and 124 to ring simultaneously. Additional details regarding setting urgency priorities and routing instructions will be described below with respect to FIGS. 3 and 4.

FIG. 2 illustrates computing system architecture for the cell phone 102 utilized in an illustrative embodiment of the invention. The cell phone 102 includes a central processing unit (CPU) 210, a system memory 202, and a system bus 212 that couples the system memory 202 to the CPU 210. The system memory 202 includes read-only memory (ROM) 207 and random access memory (RAM) 205. The cell phone 102 further includes memory such as a mass storage device (MSD) 214 for storing an operating system 217, the local address book 104, the routing mechanism firmware 107, routing instructions 220, and a web browser 222. The routing mechanism firmware 107 includes a UI render module 208 that generates GUIs, which receive and display data associated with urgency priority and routing communication. It should be appreciated that the same urgency priorities, UI render module, and routing instructions stored locally on the cell phone 102 can also be stored on the server computer 110 for centralized access by senders of communication. The UI render module may take the form of an applet or website for example. The recipient may also update the server computer 110 utilizing the web browser 222 with Internet connectivity.

The MSD 214 is connected to the CPU 210 through a mass storage controller (not shown) connected to the system bus 212. The MSD 214 and its associated computer-readable media, provide non-volatile storage for the cell phone 102. Although the description of computer-readable media contained herein refers to a MSD, such as a hard disk or RAID array, it should be appreciated by those skilled in the art that computer-readable media can be any available media that can be accessed by the CPU 210.

The CPU 210 may employ various operations discussed in more detail below with reference to FIG. 5 to provide and utilize the signals propagated between the cell phone 102, the networks 117 and 118, and the other communication and computing devices illustrated in FIG. 1. The CPU 210 may store data to and access data from the MSD 214. Data is transferred to and received from the MSD 214 through the system bus 212. The CPU 210 may be a general-purpose computer processor. Furthermore, as mentioned below, the CPU 210, in addition to being a general-purpose programmable processor, may be firmware, hard-wired logic, analog circuitry, other special purpose circuitry, or any combination thereof.

According to various embodiments of the invention, the cell phone 102 operates in a networked environment, as shown in FIG. 1, using logical connections to remote computing devices via network communication, such as an Intranet, or a local area network (LAN). The cell phone 102 may connect to the networks 117 or 118 via a network interface unit 211. It should be appreciated that the network interface unit 211 may also be utilized to connect to other types of networks and remote computer systems. The cell phone 102 may also include an input/output controller 213 for receiving and processing input from a number of devices, including a keypad (not shown). Similarly, an input/output controller 213 may provide output to a display screen 215, a printer, or other type of output device.

A computing device, such as the cell phone 102, typically includes at least some form of computer-readable media. Computer readable media can be any available media that can be accessed by the cell phone 102. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the cell phone 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

FIG. 3 illustrates interface displays utilized in an illustrative embodiment of the invention. The user interfaces (UIs) 302, 304, and 305 include a variety of settings representing data entries identifying urgency priority capabilities associated with certain senders and/or communication received from certain senders. Embodiments of the present invention allow senders of communication the option or no option of designating their communication, such as calls or text messages, with a certain priority level depending on a particular priority urgency level that can be determined by a recipient as recorded for example in the recipient's address book. As illustrated in UI 302, a recipient can designate an individual sender as having either options for designating priority or a default setting. In UI 302, the recipient has selected an options setting for John Doe. Thus, when John Doe attempts to communicate with the recipient he has options for designating or changing the priority of his call or text message. For instance, the sender's communication can be associated with either a high (1), medium (2) or a low (3) urgency priority. It should be appreciated that options other than high, medium or low, such as super high, super medium, super low may be available in embodiments of the present invention.

Based on the urgency priority of the sender's communication, the communication can be routed differently. For instance, in UI 304 the recipient may designate John Doe as having a high (1) priority. Because John also has an "Options" designation, John may change the priority of his communication when he attempts to communicate with the recipient. For example, John may input a star (*) and/or a number prior to or subsequent to dialing a phone number of the recipient to indicate his desire to exercise his priority options. John, as a caller, may then be able to push a one, two or three button to designate high, medium or low priority. John may also respond to voice prompt options initiated due to his options status from an interactive voice response system. Thus, when the address book has an "Options" setting for a sender in the contact list, the routing mechanism firmware 107 and 115 would specify to route communication from the sender to an automated system first to get one, two, three prompts for the sender's urgency level. Senders may be identified by mechanisms such as caller ID. Unidentified callers or senders may not have any option to send an urgent or normal message and would default to low priority (3).

In some embodiments of the invention, John may lower the urgency priority of his communication designated by the recipient, but will be prohibited from raising the urgency priority. For example, if John has been designated as a medium (2) priority by the recipient, even though John has options, he will be prohibited from overriding his status to a high (1) priority. UI 304 essentially illustrates an address book, for instance on the cell phone 102, with each contact or sender having an associated communications number, such as a phone number, and a level of urgency. The recipient may also designate a relationship with the contact for other options at designating urgency priority. For instance, in UI 305 the recipient may designate urgency priorities based his or her relationship with contacts or senders of communication. For example, a recipient could have preset levels so that his spouse's or boss's call is always going to be treated as a high urgency priority (1), calls from friends are treated as medium (2), and acquaintances will get low urgency priority. Unidentified or unclassified senders either not in the address book or without a set urgency level will have a default setting. The recipient can also designate the default setting, which is likely to be medium or low urgency.

Figure 4:
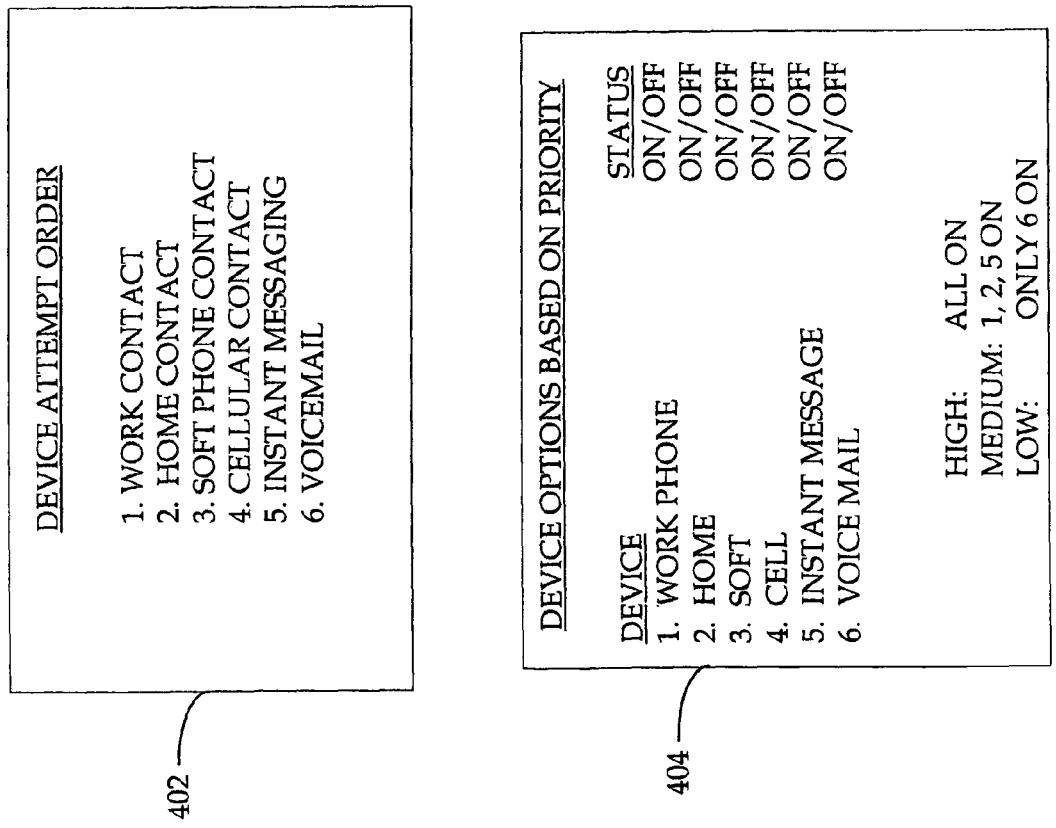
FIG. 4 illustrates interface displays of communication device attempt order and on/off status according to an illustrative embodiment of the invention.

FIG. 4 illustrates interface displays of communication device attempt order and on/off status according to an illustrative embodiment of the invention. The UIs 402 and 404 illustrate various routing options based on urgency priority. For instance a medium or normal (2) urgency priority may attempt to contact the devices in UI 402 in sequential order. However, if the urgency priority is (3), then the devices may be set to ring receive communication simultaneously and/or come off of silence mode.

UI 404 permits a recipient to enter and view routing instructions or options based on the urgency priority. For instance, a low priority would only go to voice mail, whereas a medium priority would attempt to connect with devices 1, 2, and 5 either sequentially or simultaneously. A lower priority call being routed to voicemail can also be designated to vibrate your phone to provide notice that a call occurred. A high urgency priority may attempt to contact all devices as described above. The user can set up these routing instructions based on "ON/OFF" status of the device based on priority. Additional details regarding routing communication based on urgency priority will be described below with respect to FIG. 5.

Figure 5:
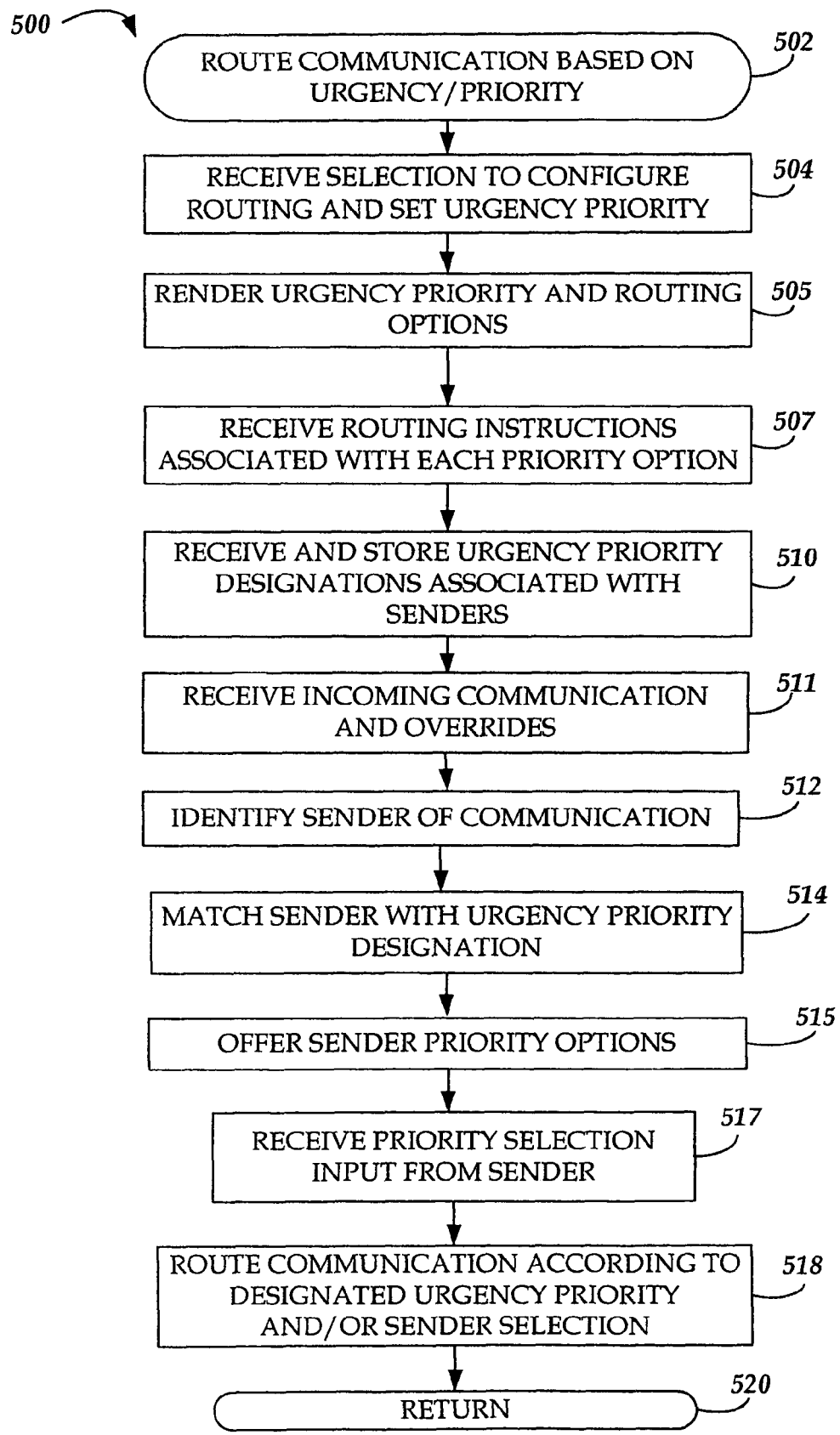
FIG. 5 illustrates an operational flow performed in routing communication based on urgency priority according to an illustrative embodiment of the invention.

Referring now to FIG. 5, operational flow 500 performed in routing communication based on an urgency priority according to an illustrative embodiment of the invention is described. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 5 illustrates an operational or logical flow 500 performed in routing communication based on an urgency priority according to an illustrative embodiment of the invention. The logical flow 500 begins at operation 504, where a communications device, such as the cell phone 102, receives a selection to configure communication routing and setup urgency priorities. Next at operation 505, the cell phone 102 renders urgency priority and/or routing options via an interface display in response to receiving the selection, for example as illustrated in FIGS. 3 and 4.

Next at operation 507, the cell phone 102 receives and stores routing instructions associated with each priority option. Then at operation 510, the cell phone 102 receives and stores designations for urgency priority associated with senders and/or communication received from senders. Here a recipient can associate certain types of users or even groups of users depending on how the recipient organizes his or her address book. Typically, the recipient would go through each sender and set an option, for instance, for each contact. The recipient could set a priority level associated with that contact and then have some overriding routing options for each type of priority.

It should be appreciated that the routing instructions and urgency priority designations may be received, stored, and accessed via the server computer 110 as well. For instance, when communication is initiated via the AIN/PSTN 118 the server 110 may be accessed for routing instructions prior to disseminating the communication to one or more of the recipient's communication devices.

Once the urgency priority designations and the routing instructions have been set up, the cell phone 102 receives incoming communication including any overrides at operation 511. As described above, a sender may generate an urgency priority override to override an urgency priority designation when initiating or during communication, for example by entering a priority number after dialing the recipient's number. This feature is likely to be used to lower the priority of the communication for matters that are not urgent. Changing the urgency priority designation to a higher level in an override can be prohibited.

Next at operation 512, the cell phone 102 identifies the sender of the communication, such as via a caller identification notice. Then at operation 514, the cell phone 102 matches the sender with the recorded urgency priority for that sender. When the sender has an option for urgency priority, the cell phone 102 offers the sender options to select the priority for the communication at operation 515. As described above, this may be via recorded voice interactive system.

Next at operation 517, the cell phone 102 receives urgency priority change or selection from the sender. Then at operation 518, the cell phone 102 routes the communication according to the urgency priority set by the recipient or overridden by the sender. The logical flow 500 returns control to other routines at return operation 520.

Thus, the present invention is presently embodied as methods, systems, computer program products or computer readable mediums encoding computer programs for routing communication based on urgency priority.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for routing a communication from a sender to a receiver based on an urgency priority, the method comprising:
   receiving from the receiver a designation whether the sender has urgency priority options;
   receiving an incoming communication from the sender addressed to the receiver;
   only if the designation from the receiver is that the sender has urgency priority options, receiving from the sender of the incoming communication a sender's priority designation;
   in a computing apparatus device, determining an urgency priority designation associated with the incoming communication according to at least the sender's priority designation; and
   routing the incoming communication according to routing instructions associated with the urgency priority designation.

2. The method of claim 1, further comprising, prior to receiving the incoming communication:
   receiving a selection to configure routing of communication based on one or more urgency priority designations;
   rendering urgency priority options and routing options that provide routing instructions via a user interface;
   receiving routing instructions associated with each urgency priority designation; and
   receiving and recording the urgency priority designation associated with the sender associated with the incoming communication.

3. The method of claim 2, wherein receiving routing instructions associated with each urgency priority designation comprises receiving instructions to route communication having a high urgency priority to a cellular phone of a recipient first.

4. The method of claim 2, further comprising:
   determining a location of a recipient of the incoming communication; wherein receiving routing instructions associated with each urgency priority designation comprises receiving instructions to route communication having a high urgency priority to the location of the recipient.

5. The method of claim 1, further comprising:
   before receiving from the sender a sender's priority designation, offering the sender priority designation options based on the designation that the sender has urgency priority options; and
   wherein receiving from the sender a sender's priority designation comprises receiving a selection of one of the routing options from the sender.

6. The method of claim 1, further comprising the step of:
   before receiving the incoming communication, receiving from the receiver a receiver's priority designation associated with the sender.

7. The method of claim 6, wherein the step of determining an urgency priority designation associated with the incoming communication according to at least the sender's priority designation comprises determining the urgency priority designations to be equal to or less than the receiver's urgency priority designation associated with the sender.

8. The method of claim 1, wherein the step of receiving from the sender of the incoming communication a sender's priority designation comprises receiving one or more digits in connection with a dialed phone number, the digits indicating a desire to exercise urgency priority options.

9. The method of claim 8, wherein the step of receiving from the sender of the incoming communication a sender's priority designation further comprises receiving a digit designating one of high, medium and low priority.

10. The method of claim 1, wherein receiving incoming communication comprises receiving one of a telephone call, an email, or a text message.

11. A computer-usable medium having computer readable instructions stored thereon for execution by a processor to perform a method for routing a communication from a sender to a receiver based on an urgency priority, the method comprising:
    receiving from the receiver a designation whether the sender has urgency priority options;
    receiving an incoming communication from the sender addressed to the receiver;
    only if the designation from the receiver is that the sender has urgency priority options, receiving from the sender of the incoming communication a sender's priority designation;
    in a computing apparatus device, determining an urgency priority designation associated with the incoming communication according to at least the sender's priority designation; and
    routing the incoming communication according to routing instructions associated with the urgency priority designation.

12. The computer-usable medium of claim 11, wherein the method further comprises, prior to receiving the incoming communication:
    receiving a selection to configure routing of communication based on one or more urgency priority designations;
    rendering urgency priority options and routing options that provide routing instructions via a user interface;
    receiving routing instructions associated with each urgency priority designation; and
    receiving and recording the urgency priority designation associated with the sender associated with the incoming communication.

13. The computer-usable medium of claim 12, wherein receiving routing instructions associated with each urgency priority designation comprises receiving instructions to route communication having a high urgency priority to a cellular phone of a recipient first.

14. The computer-usable medium of claim 12, wherein the method further comprises:
    determining a location of a recipient of the incoming communication; wherein receiving routing instructions associated with each urgency priority designation comprises receiving instructions to route communication having a high urgency priority to the location of the recipient.

15. The computer-usable medium of claim 11, wherein the method further comprises:
before receiving from the sender a sender's priority designation, offering the sender priority designation options based on the designation that the sender has urgency priority options; and
wherein receiving from the sender a sender's priority designation comprises receiving a selection of one of the routing options from the sender.

16. The computer-usable medium of claim 11, wherein the method further comprises the step of:
before receiving the incoming communication, receiving from the receiver a receiver's priority designation associated with the sender.

17. The computer-usable medium of claim 16, wherein the step of determining an urgency priority designation associated with the incoming communication according to at least the sender's priority designation comprises determining the urgency priority designations to be equal to or less than the receiver's urgency priority designation associated with the sender.

18. The computer-usable medium of claim 11, wherein the step of receiving from the sender of the incoming communication a sender's priority designation comprises receiving one or more digits in connection with a dialed phone number, the digits indicating a desire to exercise urgency priority options.

19. The method of claim 18, wherein the step of receiving from the sender of the incoming communication a sender's priority designation further comprises receiving a digit designating one of high, medium and low priority.

20. The method of claim 11, wherein receiving incoming communication comprises receiving one of a telephone call, an email, or a text message.

* * * * *